Sept. 21, 1943. A. N. BRUNSON 2,329,978
ENGINEER'S LEVEL
Filed Feb. 23, 1942
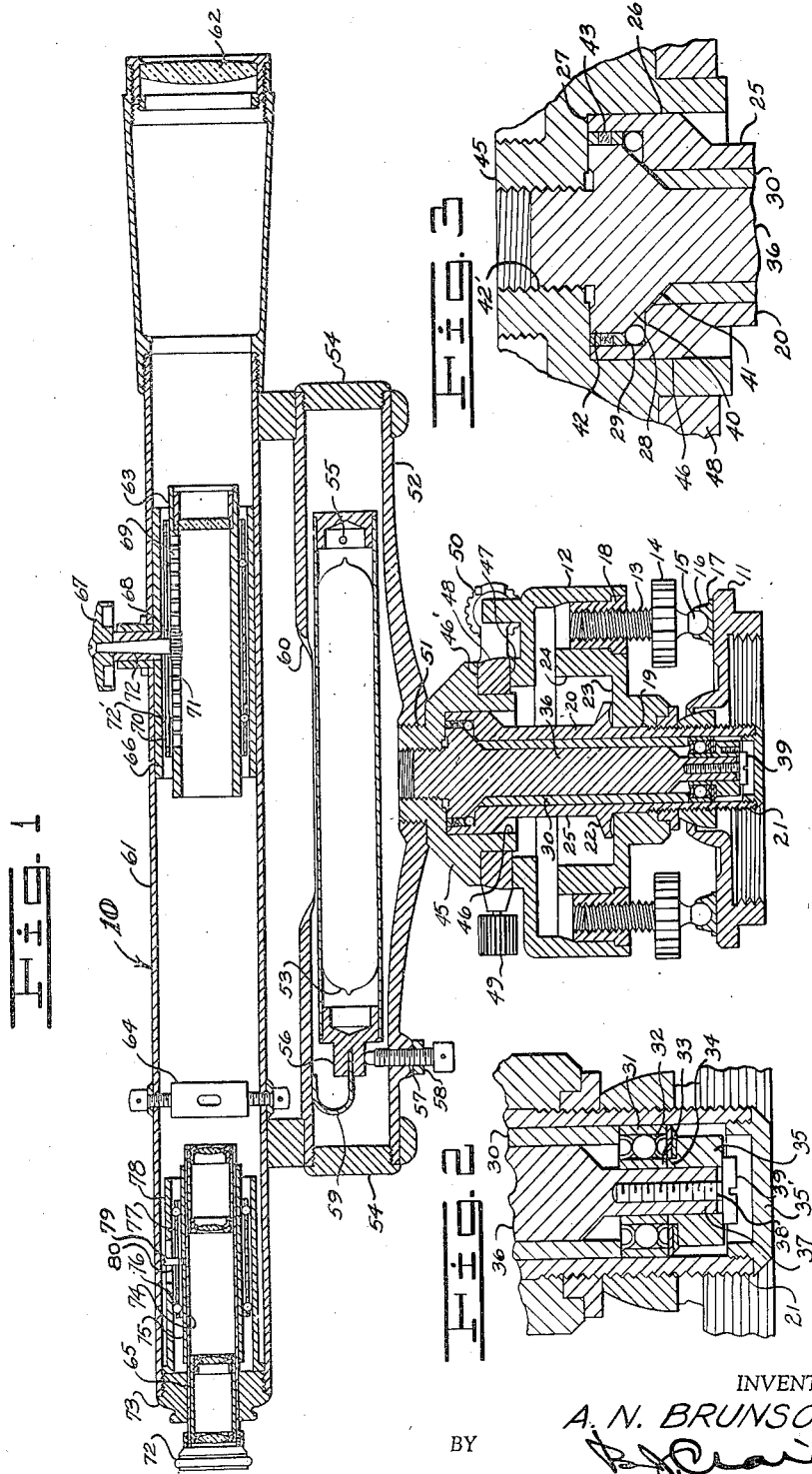
INVENTOR.
A. N. BRUNSON
BY 
ATTORNEY Patented Sept. 21, 1943

2,329,978

UNITED STATES PATENT OFFICE 2,329,978

ENGINEER'S LEVEL

Amber N. Brunson, Kansas City, Mo.

Application February 23, 1942, Serial No. 431,937

1 Claim. (Cl. 33—73)

This invention relates to improvements in an engineer's level.

The general object of the invention is to provide a surveying instrument such as a level with novel supporting means for a telescope whereby greater accuracy is secured.

A more specific object of the invention is to provide a novel spindle mounting for the telescope of a surveying instrument.

Another object of the invention is to provide an engineer's level including a novel post construction.

An additional object of the invention is to provide an improved engineer's level wherein a novel telescope is provided.

Another object of the invention is to provide an improved mounting for the telescope of a surveyor's instrument which is constructed so that the parts remain accurate regardless of expansion and contraction.

Other objects and advantages of this invention will be apparent from the following description taken in connection with the accompanying drawing, wherein:

Fig. 1 is a central sectional view showing an engineer's level embodying the features of my invention;

Fig. 2 is an enlarged fragmentary section showing the lower part of the mounting, and Fig. 3 is a view similar to Fig. 2 showing the upper part of the mounting.

This invention is an improvement on the invention shown in my prior Patents No. 2,208,014, granted July 16, 1940, and No. 2,164,051, granted June 27, 1939, and No. 2,280,057, granted April 21, 1942. While my prior patents disclose novel means for supporting the spindle and shell of a surveying instrument in anti-friction bearings, the present application discloses further improved details of construction which have been found highly advantageous in actual practice, particularly in constructions wherein the available space for mounting bearings is limited.

In the accompanying drawing my invention is shown as embodied in an engineer's level which is indicated generally at 10. As shown the level includes a foot plate 11 on which a leveling head 12 is supported by a plurality of screws 13. Each of the screws 13 includes a head 14 terminating in a ball member 15 which engages in a socket 16 on a foot member 17. The foot members 17 are arranged on the foot plate 11. The screws 13 engage in threaded bushings 18 on the leveling head.

The leveling head 12 is provided with a central aperture 19 in which a post 20 is mounted. The post includes a lower threaded portion 21 with a flange 22 disposed intermediate the length of the post. The flange 22 is outwardly directed and engages the lower wall 23 of a recess 24 in the leveling head 12. The post includes a cylindrical portion 25 above the flange 22 and above the portion 25 includes an enlarged end portion 26 from which a collar 27 extends. At the junction of the portions 26 and 27 I arrange a plane seat portion 28 which is engaged by a plurality of anti-friction balls 29.

Mounted within the post 20 I arrange a sleeve 30 (see Fig. 2). This sleeve 30 at its lower end engages the outer element 31 of an anti-friction ball race 32 which includes an inner element 33. The inner element 33 is engaged by a flange 34 on a retaining ring 35. The lower end of the post is closed by a threaded closure 35'.

Mounted within the sleeve 30 I provide a spindle 36. This spindle 36 is cylindrical and includes a lower reduced cylindrical portion 37 which receives the inner ball race 33 and also receives the retaining ring 35. The portion 37 includes a threaded aperture at its lower end. In this aperture I arrange a cap 38 the head 39 of which engages the lower end of the ring 35 to hold the parts assembled.

The upper portion of the spindle is provided with an outwardly projecting flange 40 (see Fig. 3), the lower face of which is beveled as at 41 with the bevelled portion engaging the ball members 29 previously described. Above the bevelled portion 41 the flange 40 has a cylindrical outer face 42. Spaced from the collar 27 on the post and in this space I arrange a dirt and dust excluding seal 43.

Above the flange 40 the spindle is of reduced diameter and is threaded as at 42'. Mounted on the threaded portion 42' I arrange a threaded coupling 45. This coupling 45 includes a lower cylindrical recess 46 in which the cylindrical upper end of the post 20 is arranged. The coupling 45 includes a shoulder 46' spaced above a shoulder 47 on the leveling head 12 and between the shoulders 46' and 47 I arrange a clamp ring 48. The clamp ring includes a clamp screw assembly 49 and a slow motion assembly 50. The clamp ring 48, the clamp screw 49 and the slow motion assembly 50 form no part of the present invention.

The upper portion of the coupling 45 is of reduced diameter and is threaded as at 51 and on this threaded portion 51 I mount a level bar 52. Mounted upon the level bar 52 I show a level vial 53 which is supported in the level bar 52 which is hollow and is provided with end closures 54. At one end the level vial is pivoted as at 55 and at the other end includes a projection 56 engaged by an adjusting screw 57 which includes a lock nut 58. A leaf spring 59 on the portion 56 normally urges the vial against the upper end of the adjusting nut 57. The vial is viewed through a viewing aperture 60.

Mounted upon the level bars 52 I show a telescope 61. The telescope includes an objective lens 62, a negative lens tube 63, a cross wire reticule 64 and an eye piece assembly 65. The negative lens tube 63 is slidable in a tube 66 and is shifted by turning the thumb screw 67 on which a gear 68 is mounted. The gear 68 meshes with a rack 69 on the tube 63.

Between the tubes 63 and 66 I arrange a ball bearing retainer 70 which is provided with an elongated slot 71 which permits passage of a shaft 72 on which the thumb screw 67 is mounted. Balls 72' are arranged in suitable holes in the retainer 70. The balls 72' engage the tubes 63 and 66 and thus form a support for the tube 63.

The eye piece assembly 65 includes an eye piece 72 and the assembly includes a threaded cap member 73 which threads into the end of the telescope. The assembly supports a tube 74 and a second tube 75 surrounding the tube 74. The tube 75 engages anti-friction balls 76 which are held in a tubular retainer 77 and which engage the inner surface of a sleeve 78. A pin 79 in the tube 75 and movable in a slot 80 limits movement of the eye piece.

From the foregoing description it will be apparent that I have invented a novel engineer's level which can be economically manufactured and is highly efficient for the intended purpose.

Having thus described my invention, I claim:

A support for a surveying instrument telescope comprising a foot plate, a hollow post universally mounted on said foot plate, said post having a short external flange substantially midway of its length, a leveling head, said head including an aperture receiving said post and including a portion engaged by said flange, threaded means on said post and engaging the head to urge the head and flange into engagement, leveling screws engaging said foot plate and said head for leveling the latter, a sleeve within and directly engaging said hollow post, a bearing within said post and engaging said sleeve, a spindle within and directly engaging the sleeve, said spindle having a reduced lower end slidably engaging said bearing, means to hold said bearing in place, said post having an enlarged upper end and having an integral annular collar at the extreme upper end thereof, said collar forming an upper interior bearing recess, balls in said recess, said spindle having an outwardly directed flange adjacent the upper end thereof, said spindle flange having an inclined bearing face engaging said balls, sealing means between said collar and spindle flange for excluding dirt from said balls, and a coupling member mounted directly on said spindle, said coupling member having a downwardly directed skirt forming a cylindrical recess, said integral collar on said post being arranged in said last mentioned recess, the upper end of said sleeve terminating below the bearing recess in said collar.

AMBER N. BRUNSON.